US007305660B2

(12) United States Patent
Ageyev et al.

(10) Patent No.: US 7,305,660 B2
(45) Date of Patent: Dec. 4, 2007

(54) METHOD TO GENERATE A FORMATTED TRACE FOR AN EMBEDDED DEVICE

(75) Inventors: Igor I. Ageyev, Tucson, AZ (US); Sangram S. Ghoman, Tucson, AZ (US); Jonathan M. Hale, Tucson, AZ (US); Russell L. Lewis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 10/652,020

(22) Filed: Aug. 29, 2003

(65) Prior Publication Data

US 2005/0050523 A1   Mar. 3, 2005

(51) Int. Cl.
*G06F 9/44* (2006.01)
*G06F 9/445* (2006.01)

(52) U.S. Cl. .................. 717/128; 717/130; 717/140; 717/168

(58) Field of Classification Search ........ 717/127–135, 717/140–161
See application file for complete search history.

(56) References Cited

U.S. PATENT DOCUMENTS

| | | | | |
|---|---|---|---|---|
| 5,414,855 | A | * | 5/1995 | West .......................... 717/158 |
| 5,748,878 | A | | 5/1998 | Rees et al. ............. 395/183.14 |
| 5,751,942 | A | * | 5/1998 | Christensen et al. .......... 714/38 |
| 5,960,199 | A | | 9/1999 | Brodsky et al. ............ 395/704 |
| 6,145,123 | A | * | 11/2000 | Torrey et al. ................ 717/128 |
| 6,282,701 | B1 | | 8/2001 | Wygodny et al. .............. 717/4 |
| 6,367,036 | B1 | | 4/2002 | Hansen ......................... 714/45 |
| 6,507,921 | B1 | | 1/2003 | Buser et al. ................... 714/45 |
| 6,826,747 | B1 | * | 11/2004 | Augsburg et al. ........... 717/128 |
| 6,948,155 | B2 | * | 9/2005 | Agarwala et al. ........... 717/128 |
| 7,100,151 | B2 | * | 8/2006 | Johnsen et al. .............. 717/128 |
| 7,219,333 | B2 | * | 5/2007 | Agarwala et al. ........... 717/128 |
| 2002/0087949 | A1 | * | 7/2002 | Golender et al. ........... 717/124 |

(Continued)

FOREIGN PATENT DOCUMENTS

JP          11232211          8/1999

(Continued)

OTHER PUBLICATIONS

Borgeest et al., Trace analysis with a relational database system, IEEE, Jan. 1996 pp. 243-250.*

(Continued)

*Primary Examiner*—Wei Zhen
*Assistant Examiner*—Satish S Rampuria
(74) *Attorney, Agent, or Firm*—Chandler & Udall, LLP; Dale F. Regelman

(57) ABSTRACT

A method to generate a formatted trace for a second device embedded in a first device. The method provides source code comprising a trace entry, compiles that source code to form an embedded device code image comprising a trace description string and a trace description string address, and assigns the trace description string address as the traceId. The method creates a database comprising the trace description string and the trace description string address. The method uploads to the second device the embedded device code image, and generates trace data using that stripped code. The method then downloads that trace data to the first device, merges that trace data with the database, and forms a formatted trace.

16 Claims, 9 Drawing Sheets

U.S. PATENT DOCUMENTS

| | | |
|---|---|---|
| 2002/0100025 A1 | 7/2002 | Buechner et al. .......... 717/131 |
| 2002/0129335 A1 | 9/2002 | Lewis ....................... 717/124 |
| 2002/0129339 A1* | 9/2002 | Callahan et al. ........... 717/127 |
| 2003/0061550 A1* | 3/2003 | Ng et al. ..................... 714/45 |
| 2003/0196192 A1* | 10/2003 | Barclay et al. ............. 717/128 |
| 2006/0200806 A1* | 9/2006 | Tasinga ..................... 717/128 |

FOREIGN PATENT DOCUMENTS

| | | |
|---|---|---|
| JP | 2000020619 | 1/2000 |
| JP | 2001216182 | 8/2001 |

OTHER PUBLICATIONS

Dauphin et al., SIMPLE: a universal tool box for event trace analysis, IEEE, Sep. 1996 pp. 59-59.*

Wu et al., From Trace Generation to Visualization: A Performance Framework for Distributed Parallel Systems, IEEE, Nov. 2000 pp. 50-68.*

Why and how of requirements tracing, Watkins, R.; Neal, M., Software, IEEE, vol. 11 Issue: Jul. 4, 1994, pp. 104-106.*

Gantt Chart visualization for MPI and Apache multi-dimensional trace files, Wu, C.E.; Bolmarcich, A., Parallel and Distributed Systems, IEEE, 2002. Proceedings. Ninth International Conference on, Dec. 17-20, 2002, pp. 523-528.*

From Trace Generation to Visualization: A Performance Framework for Distributed Parallel Systems, Wu, C.E.; Bolmarcich, A.; Snir, M.; Wootton, D.; Parpia, F.; Chan, A.; Lusk, E.; Gropp, W., Supercomputing, ACM/IEEE 2000 Conference, Nov. 4-10, 2000, pp. 1-18.*

IBM Corp, "Process For Real-Time, Trace-Driven Performance Monitors," Oct. 1991, 415-417.

* cited by examiner

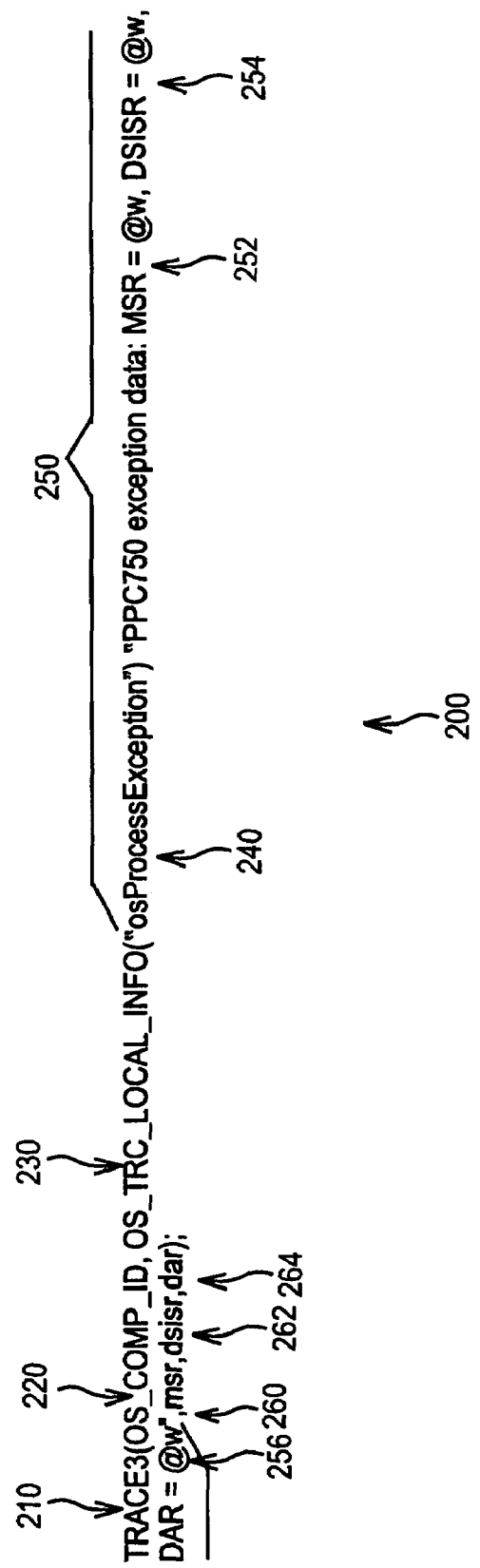

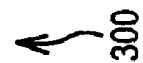

FIG. 3

```
#define TRACE_MAGIC_PREFIX "LPTRACE_PRE"

#define TRACE_MAGIC_SUFFIX "LPTRACE_SUF"

#define TRACEID(str) (TRACE_MAGIC_PRE str "TRACE_MAGIC_SUF)

#define TRACE3(compIdIn, traceStrIn, data1In, data2In, data3In) \
    osiTrace3(compIdIn, TRACEID("3"traceStrIn),(UINT32)(data1In), (UINT32)(data2In), (UINT32)(data3In))

define OS_LNTSTR1(lineIn) #lineIn define OS_LNTSTR(lineIn) OS_LNTSTR1(lineIn)

define OS_TRC_LOCAL_INFO(functionNameIn) \
    _FILE_"," OS_LNTSTR(__LINE__)"," functionNameIn ":"
```

```
osiTRACE3(OS_COMP_ID,("LPTRC_PRE3 osprocexception.c, 765, osProcessException: PPC750 exception data: MSR = @w,
DSISR = @w, DAR = @w LPTRC_SUF"), (UINT32)(msr), (UINT32)(DSISR), UINT32)(dar));
```

410

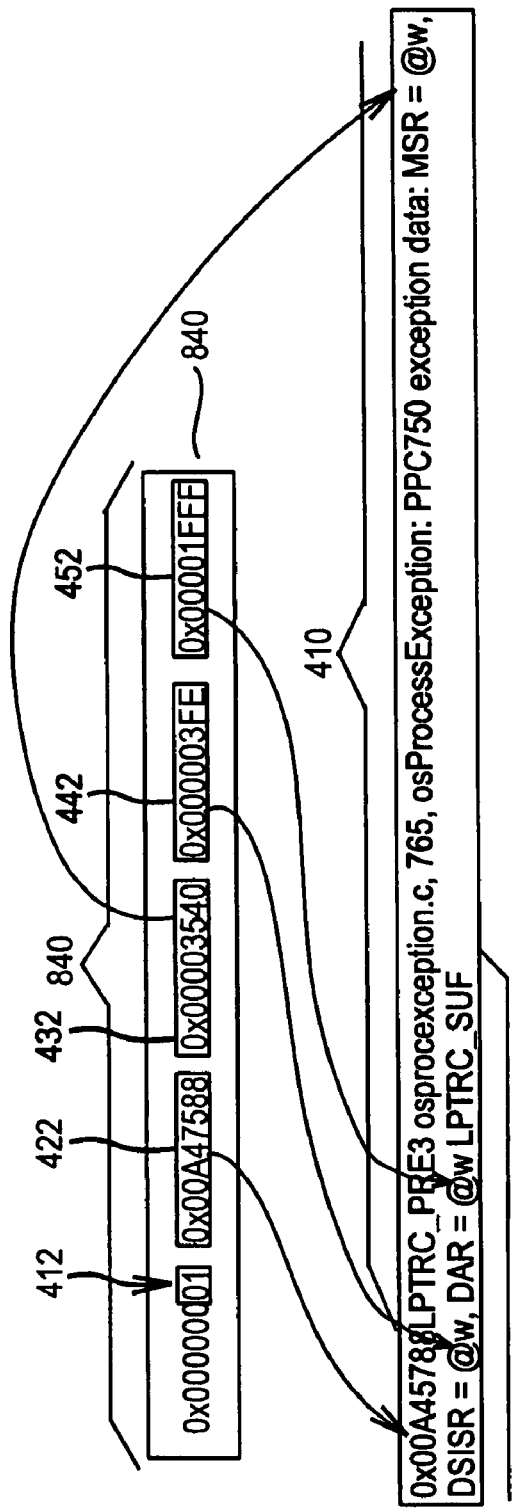

US 7,305,660 B2

METHOD TO GENERATE A FORMATTED TRACE FOR AN EMBEDDED DEVICE

FIELD OF THE INVENTION

This invention relates to generating a formatted trace for an embedded device.

BACKGROUND OF THE INVENTION

Automated media storage libraries are known for providing cost effective access to large quantities of stored media. These media libraries are often interconnected with one or more host computers. Those one or more host computers write information to one or more information storage media disposed in the library, and/or read information from those one or more information storage media.

The various components of such media storage libraries often include what are sometimes referred to as "embedded" systems, applications, or devices. Such embedded systems comprise special purposes systems requiring high performance but having relatively few dedicated resources. For example, embedded devices typically comprise relatively little memory, a low performance processor, few if any standard utilities, and no hard disks.

In addition, embedded devices typically do not comprise a conventional operating system. A conventional operating system is written for flexibility. An embedded system, however, performs a single purpose. Therefore, such an embedded device operates using a device microcode written to optimize the device's single function.

A PCI card comprises such an embedded device. Such a PCI card typically includes a processor, a flash memory, and SDRAM. A FICON interface card comprises another such embedded device.

In order to monitor the performance of an embedded device, the device microcode includes instructions for logging data. In the event of a device error, that logged data can be analyzed to determine the cause of the error. Periodically during the operation of the embedded device, a trace statement is issued which causes, inter alia, the parameters the device is executing on at that point in time to be written to a memory device. This trace data is typically written to a revolving trace buffer.

If an error is detected, the trace buffer is downloaded, and the trace data is used to determine the source of the error. In order to adequately monitor the performance of such an embedded device, the device microcode must include many trace statements.

What is needed is a method to facilitate the creation of such trace statements, where the output of that trace statement is maximally descriptive. Applicants' method autogenerates a trace identifier, thereby, simplifying the formation of the corresponding trace statement.

SUMMARY OF THE INVENTION

Applicants' invention includes an apparatus and method to generate a formatted trace for a second device embedded in a first device. The method provides source code comprising a trace entry, and compiles that source code by the first device to form an embedded device code image comprising a trace description string and a trace description string address. The method creates a database comprising the trace description string and the trace description string address.

The method uploads to the second device the embedded device code image, and generates trace data using that code. The method then downloads that trace data to the first device, merges that trace data with the database, and forms a formatted trace.

BRIEF DESCRIPTION OF THE DRAWINGS

The invention will be better understood from a reading of the following detailed description taken in conjunction with the drawings in which like reference designators are used to designate like elements, and in which:

FIG. 2 shows a trace entry disposed in a source code;

FIG. 3 shows certain trace entry directives;

FIG. 4 shows a trace statement formed using the trace entry of FIG. 2 and the trace entry directives of FIG. 3;

FIG. 9 is a block diagram showing the merger of the trace data of FIG. 8 and the database of FIG. 6;

FIG. 10 shows a formatted trace for the embedded device.

DETAILED DESCRIPTION OF THE PREFERRED EMBODIMENTS

This invention is described in preferred embodiments in the following description with reference to the Figures, in which like numbers represent the same or similar elements.

Figure 1:
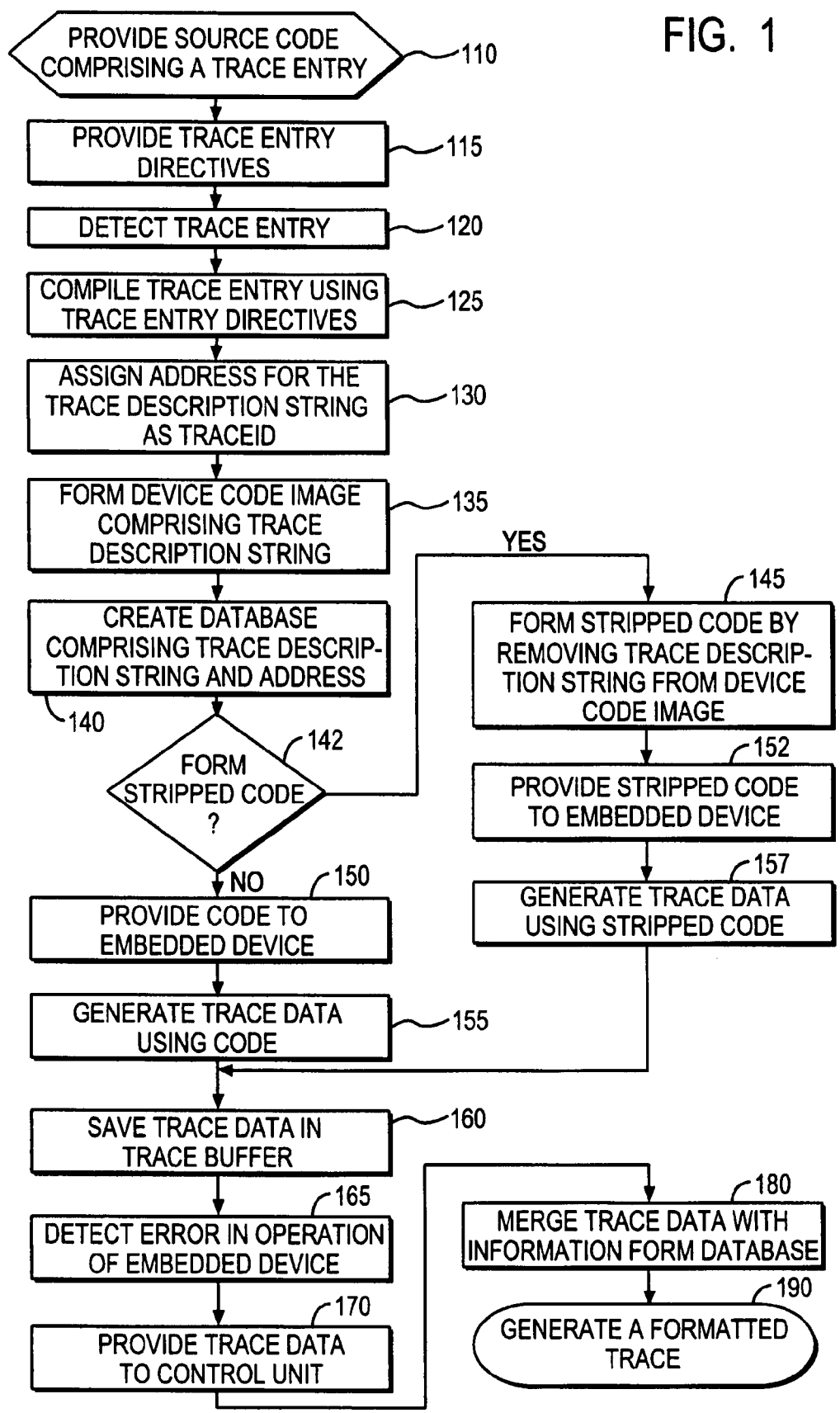
FIG. 1 is a flow chart summarizing the steps of Applicants' method.

Referring now to FIG. 1, in step 110 Applicants' method provides a source code, where that source code comprises a trace entry. FIG. 2 recites trace entry 200. Trace entry 200 includes trace macro 210, i.e. "TRACE3". Trace entry 200 further includes component ID 220, i.e. OS_COMP_ID". Trace entry 200 further includes data 230 which recites the trace entry location, file name, function name, and line number, i.e. "OS_TRC_LOCAL_INFO." Trace entry 200 further includes a function name 240, i.e. "osProcessException." Trace entry 200 further includes a trace description string 250, i.e. "PPC750 exception data; MSR=@w, DSISR=@w, DAR=@w." Trace entry 200 further includes variables 260, 262, and 264.

First trace description string 250 further includes data placeholders 252, 254, and 256. The designator "@w" indicates 32 bits of data. In certain embodiments, one or more of dataplaceholders 252, 254, and/or 256, include the designator "@h," where that designator indicates 16 bits of data. In certain embodiments, one or more of dataplaceholders 252, 254, and/or 256, include the designator "@b," where that designator indicates 8 bits of data.

Referring again to FIG. 1, in step 115 Applicants' method provides trace entry directives. FIG. 3 recites trace entry directives 300. The trace entry directives of step 115 are used by a preprocessor and a compiler disposed in the first device, i.e. in the control unit.

In step 120, Applicants' method detects the trace entry. In certain embodiments, a pre-processor disposed in the control unit detects the trace entry. In certain embodiments, step 120 further includes detecting the trace macro component of the trace entry.

In step 125, Applicants' method compiles the trace entry of step 110 using the trace entry directives of step 115. FIG. 4 illustrates the result of passing the trace statement of FIG. 2 through a pre-processor using the directives of FIG. 3.

In step 130, Applicants' method takes the address of the trace description string and assigns that address as the value of the tradeId. In step 135, Applicants' method forms a device code image for the embedded device. In the illustrated embodiment of FIG. 5, device code image 500 includes instructions 510, 520, 530, 540, and 550. Instructions 510, 520, 530, 540, and 550, are written to instruction memory 501. Instruction 520 references the address for the trace description string. That address is disposed in a data memory 502, and the memory location starting with that address contains the complete trace description string 410.

In step 140, Applicants' method forms a database which includes both the trace description string and the address for that trace description string. Step 140 further includes saving that database in the first device, i.e. in the control unit.

Figure 7:
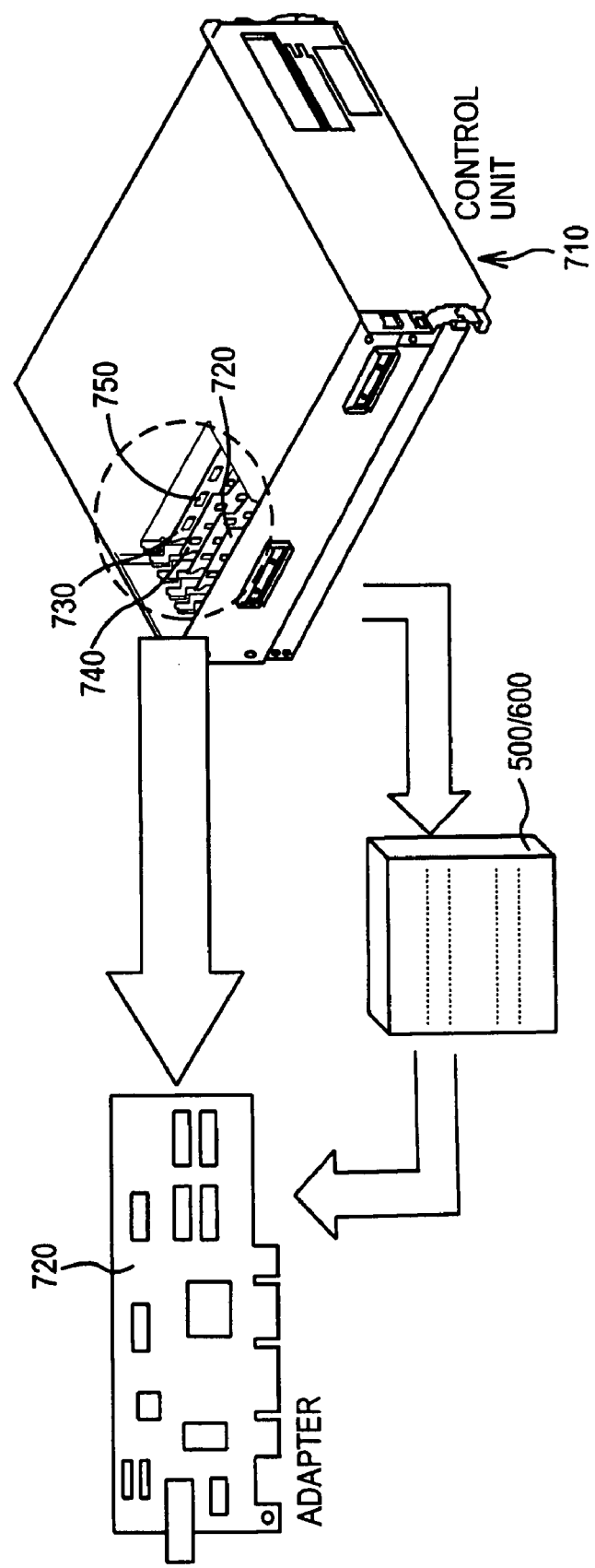
FIG. 7 is a block diagram depicting uploading the stripped code of FIG. 6 from a control unit to an embedded device.

In step 142, Applicants' method determines whether to form a stripped code by removing the trace description string from the device code image of step 135. If Applicants' method determines not to form such a stripped code, then the method transitions from step 142 to step 150 wherein the method provides the code image of step 135 to the embedded device. Referring to FIG. 7, in step 150 Applicants' method provides code 500 (FIG. 5) from control unit 710 to embedded device 720. In step 155, Applicants' method generates trace data using the code image.

Figure 5:
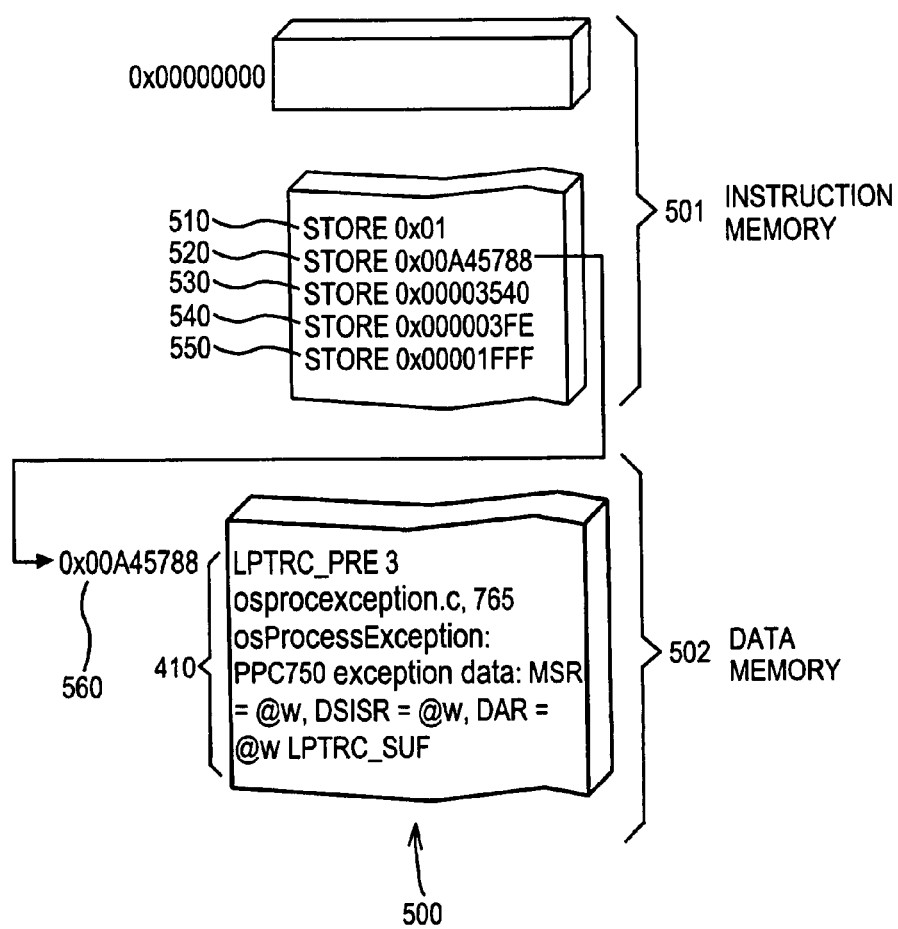
FIG. 5 is a block diagram showing an embedded device code image which includes a trace description string and a trace description string address.
Figure 6:
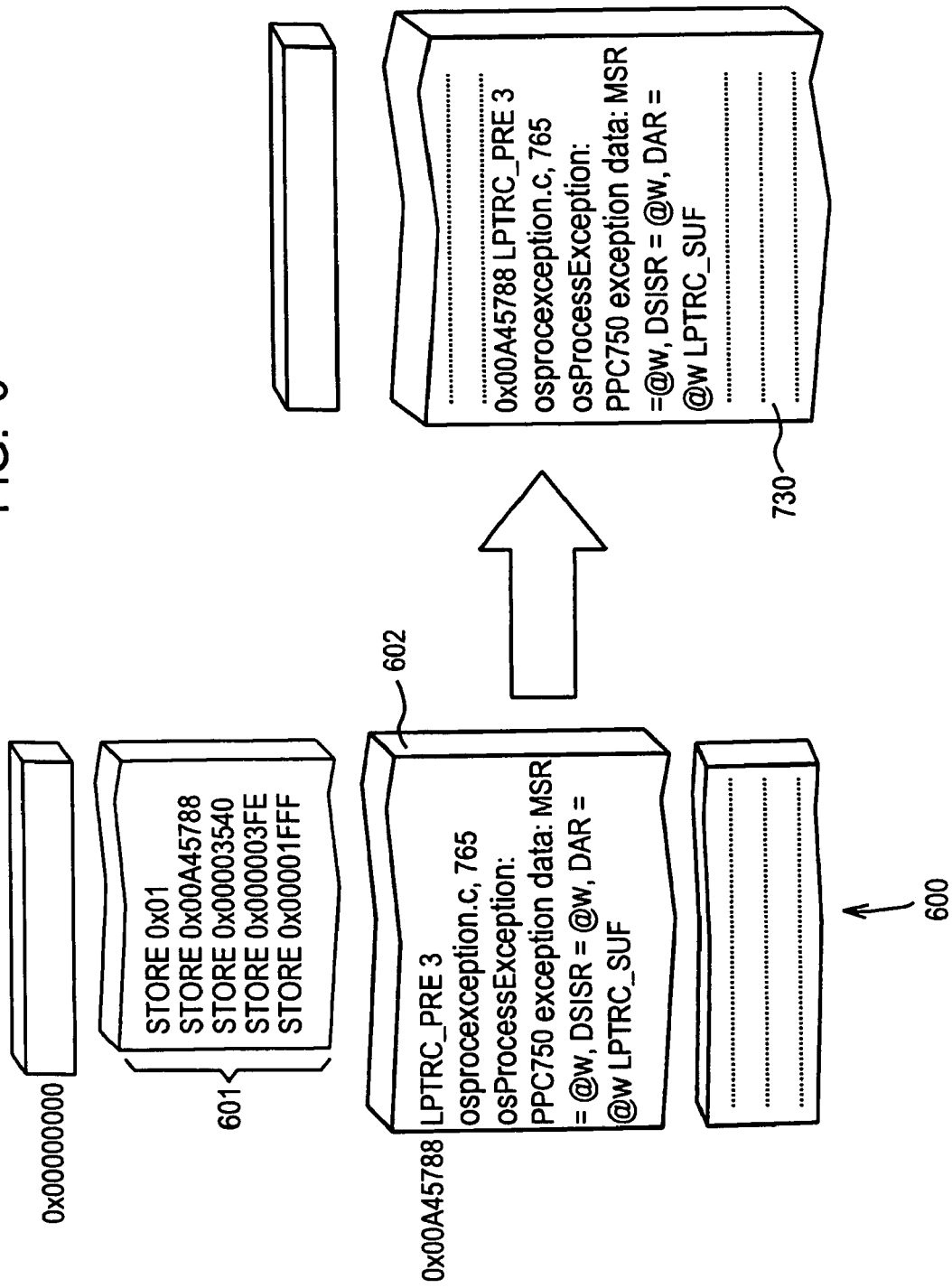
FIG. 6 is a block diagram showing a stripped code formed by removing the trace description string from the device code image of FIG. 5, where that trace description string is saved in a database.

If Applicants' method determines in step 142 to form a stripped code, then the method transitions from step 142 to step 145 wherein the method forms a stripped code by removing the trace description string from the device code image of step 135. Referring to FIG. 6, stripped code 600 (FIG. 6) is formed by removing code portion 602, i.e. address 560 comprising trace description string 410, from device code image 500 (FIG. 5).

In step 152, Applicants' method provides the stripped code of step 145 to the embedded device. Referring to FIG. 7, in step 152 Applicants' method provides code 600 from control unit 710 to embedded device 720. Trace description string 602 (FIG. 6) is saved in memory 730 disposed in control unit 710.

Figure 8:
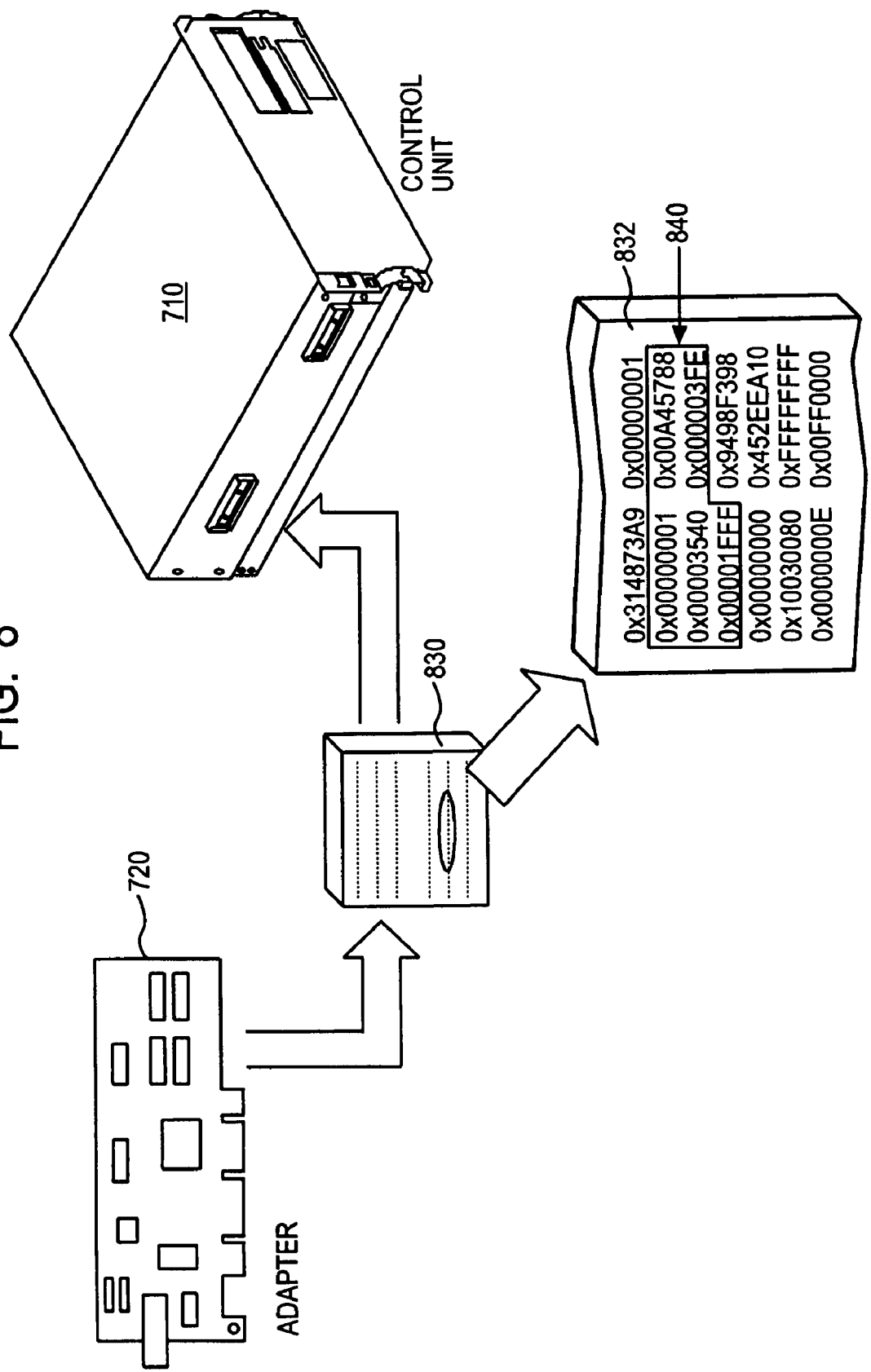
FIG. 8 is a block diagram depicting downloading trace data from the embedded device to the control unit.

In step 157, the embedded device generates trace data using the stripped code provided in step 152. Applicants' method transitions from step 157 to step 160 wherein the method saves the trace data of step 155/157 in trace buffer 830 (FIG. 8). In step 165, Applicants' method detects an error in the embedded device. In step 170, Applicants' method provides the data saved in the trace buffer to the control unit.

Referring now to FIG. 8, in step 170 the method provides the information saved in trace buffer 830 to control unit 710. Trace buffer portion 832 includes trace entry 840 which comprises address 560.

In step 180, Applicants' method merges the trace data provided in step 170 with the database of step 140. Referring to FIG. 9, in step 180 Applicants' method merges trace entry 840 with trace description string 410 to generate in step 190 formatted trace 1000 (FIG. 10).

In certain embodiments, individual steps recited in FIG. 1 may be combined, eliminated, or reordered.

Applicants' invention further includes an article of manufacture comprising a computer useable medium, such as computer useable medium 740 (FIG. 7), having computer readable program code disposed therein method to generate a formatted trace for a second device embedded in a first device using the steps of FIG. 1.

Applicants' invention further includes a computer program product, such as computer program product 750 (FIG. 7), usable with a programmable computer processor having computer readable program code embodied therein method to generate a formatted trace for a second device embedded in a first device using the steps of FIG. 1.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to generate a formatted trace for a second device embedded in a first device, comprising the steps of:
   providing source code comprising a trace entry;
   compiling by said first device said source code to form a second device code image comprising a trace description string and a trace description string address, wherein said trace description string comprises one or more data placeholders, wherein each of said one or more data placeholders are selected from the group consisting of @w, @h, and @b, wherein the data placeholder @w indicates 32 bits of data, and wherein the data placeholder @h indicates 16 bits of data, and wherein the data placeholder @b indicates 8 bits of data;
   assigning said trace description string address as the traceId;
   creating a database comprising said trace description string and said trace description string address;
   uploading said second device code image to said second device;
   generating trace data using said second device code image;
   downloading said trace data to said first device;
   merging said trace data and said database; and
   forming a formatted trace.

2. The method of claim 1, wherein said uploading step and said generating step further comprise the steps of:
   forming a stripped code by removing said trace description string from said second device code image;
   uploading said stripped code to said second device;
   generating trace data using said stripped code.

3. The method of claim 1, further comprising the steps of:
   providing trace directives;
   detecting said trace entry;
   forming a trace statement using said directives and said trace entry.

4. The method of claim 3, wherein said first device comprises a pre-processor, further comprising the steps of:
   providing a trace entry comprising a trace macro;
   replacing by said pre-processor said trace macro with a function call using said directives.

5. The method of claim 4, wherein said first device comprises a compiler, further comprising the step of forming said trace statement by said compiler using said directives.

6. The method of claim 5, wherein said second device comprises a trace buffer, further comprising the steps of:
   writing said trace data to said trace buffer;
   detecting an error in said second device;
   discontinuing writing trace data to said trace buffer.

7. An article of manufacture comprising a computer useable medium having computer readable program code disposed therein to generate a formatted trace for a second device embedded in a first device, the computer readable program code comprising a series of computer readable program steps to effect:

receiving a source code comprising a trace entry;

compiling said source code to form a second device code image comprising a trace description string and a trace description string address, wherein said trace description string comprises one or more data placeholders, wherein each of said one or more data placeholders are selected from the group consisting of @w, @h, and @b, wherein the data placeholder @w indicates 32 bits of data, and wherein the data placeholder @h indicates 16 bits of data, and wherein the data placeholder @b indicates 8 bits of data;

assigning said trace description string address as the traceId;

creating a database comprising said trace description string and said trace description string address;

uploading to said second device said second device code image;

downloading trace data generated by said second device using said second device code image;

merging said trace data and said database; and forming a formatted trace.

8. The article of manufacture of claim 7, said computer readable program code further comprising a series of computer readable program steps to effect:

forming a stripped code by removing said trace description string from said second device code image;

uploading said stripped code to said second device;

downloading trace data formed by said second device using said stripped code.

9. The article of manufacture of claim 7, the computer readable program code comprising a series of computer readable program steps to effect:

receiving trace directives;

detecting said trace entry;

forming a trace statement using said directives and said trace entry.

10. The article of manufacture of claim 9, the computer readable program code comprising a series of computer readable program steps to effect:

receiving a trace entry comprising a trace macro;

replacing said trace macro with a function call using said directives.

11. The article of manufacture of claim 10, wherein said article of manufacture comprises a compiler, the computer readable program code comprising a series of computer readable program steps to effect forming said trace statement by said compiler using said directives.

12. A computer program product embodied in a computer memory and usable with a usable programmable computer processor to generate a formatted trace for a second device embedded in a first device, comprising:

computer readable program code which causes said programmable computer processor to receive a source code comprising a trace entry;

computer readable program code which causes said programmable computer processor to compile said source code to form a second device code image comprising a trace description string and a trace description string address, wherein said trace description string comprises one or more data placeholders, wherein each of said one or more data placeholders are selected from the group consisting of @w, @h, and @b, wherein the data placeholder @w indicates 32 bits of data, and wherein the data placeholder @h indicates 16 bits of data, and wherein the data placeholder @b indicates 8 bits of data;

computer readable program code which causes said programmable computer processor to assign said trace description string address as the traceId;

computer readable program code which causes said programmable computer processor to create a database comprising said trace description string and said trace description string address;

computer readable program code which causes said programmable computer processor to upload to said second device said second device code image;

computer readable program code which causes said programmable computer processor to receive trace data generated by said second device using said second device code image;

computer readable program code which causes said programmable computer processor to merge said trace data and said database; and computer readable program code which causes said programmable computer processor to form a formatted trace.

13. The computer program product of claim 12, further comprising computer readable program code which causes said programmable computer processor to computer readable program code which causes said programmable computer processor to form a stripped code by removing said trace description string from said second device code image;

computer readable program code which causes said programmable computer processor to upload to said second device said stripped code;

computer readable program code which causes said programmable computer processor to receive trace data generated by said second device using said stripped code.

14. The computer program product of claim 12, further comprising:

computer readable program code which causes said programmable computer processor to receive trace directives;

computer readable program code which causes said programmable computer processor to detect said trace entry;

computer readable program code which causes said programmable computer processor to form a trace statement using said directives and said trace entry.

15. The computer program product of claim 14, further comprising:

computer readable program code which causes said programmable computer processor to receive a trace entry comprising a trace macro;

computer readable program code which causes said programmable computer processor to replace said trace macro with a function call using said directives.

16. The computer program product of claim 14, further comprising computer readable program code which causes said programmable computer processor to form said trace statement using a compiler and said directives.

* * * * *